(12) United States Patent
Augstkalns et al.

(10) Patent No.: US 12,467,823 B2
(45) Date of Patent: Nov. 11, 2025

(54) HORIZONTAL WIND TUNNEL WITH WIND FORCE SIMULATOR CHAMBER

(71) Applicant: STORM ADVENTURES, SIA, Marupe (LV)

(72) Inventors: Ingus Augstkalns, Marupe (LV); Kristians Rimkus, Marupe (LV)

( * ) Notice: Subject to any disclaimer, the term of this patent is extended or adjusted under 35 U.S.C. 154(b) by 319 days.

(21) Appl. No.: 18/246,685

(22) PCT Filed: Jul. 14, 2021

(86) PCT No.: PCT/LV2021/050005
§ 371 (c)(1),
(2) Date: Mar. 27, 2023

(87) PCT Pub. No.: WO2022/071786
PCT Pub. Date: Apr. 7, 2022

(65) Prior Publication Data
US 2023/0384181 A1    Nov. 30, 2023

(30) Foreign Application Priority Data
Sep. 30, 2020   (LV) .......................... LVP2020000067

(51) Int. Cl.
*G01M 9/04*    (2006.01)
(52) U.S. Cl.
CPC .................... *G01M 9/04* (2013.01)
(58) Field of Classification Search
None
See application file for complete search history.

(56) References Cited

U.S. PATENT DOCUMENTS

| 3,484,953 A | 12/1969 | Norheim, Jr. |
| 5,495,754 A | 3/1996 | Starr, Jr. et al. |

(Continued)

FOREIGN PATENT DOCUMENTS

| CN | 103364168 A | 10/2013 | |
| CN | 109029900 B | * 1/2024 | .............. G01M 9/02 |

(Continued)

OTHER PUBLICATIONS

ISR; European Patent Office; NL; Nov. 17, 2021.

*Primary Examiner* — Peter J Macchiarolo
*Assistant Examiner* — Jermaine L Jenkins
(74) *Attorney, Agent, or Firm* — Patshegen IP; Moshe Pinchas

(57) ABSTRACT

The present invention relates to horizontal wind tunnels for simulating a wind force. The simulator comprises a recirculating airflow channel (1) comprising a first horizontal side member (2), a first airflow turning member (3), a return side member (4), and a second airflow turning member (5). The first horizontal side member (2) comprises a horizontal simulator chamber (6) capable of accommodating at least one human during normal use. The simulator comprises a fan (7) mounted in the return side member (4) for providing an air flow. The simulator further comprises a contraction member (9) fitted at the inlet side of the first horizontal side member (2). The length (A) of the horizontal simulator chamber (6) is longer than the length (B) of any of the turning members (3; 5) and the same length (A) is 0.7 to 1.0 from the length (C) of the first horizontal side member (2).

12 Claims, 4 Drawing Sheets

(56) References Cited

U.S. PATENT DOCUMENTS

| | | | |
|---|---|---|---|
| 9,045,232 B1 * | 6/2015 | Burke | B64D 23/00 |
| 9,054,232 B2 | 6/2015 | Chung | |
| 9,327,202 B2 * | 5/2016 | Lurie | G09B 9/00 |
| 10,712,232 B2 * | 7/2020 | Hambleton | G01M 9/04 |
| 2005/0241385 A1 | 11/2005 | Wilson et al. | |
| 2009/0277263 A1 | 11/2009 | Petruk | |

FOREIGN PATENT DOCUMENTS

| | | |
|---|---|---|
| NZ | 568424 A | 3/2010 |
| WO | 2020100120 A2 | 5/2020 |
| WO | 2021133198 A1 | 7/2021 |

\* cited by examiner

HORIZONTAL WIND TUNNEL WITH WIND FORCE SIMULATOR CHAMBER

The present invention relates to a horizontal wind tunnel wind force simulator.

The prior art discloses various designs of horizontal wind tunnels. Typical horizontal wind tunnels are disclosed in the US patent application publication No. US2005/241385 and US patent publication No. U.S. Pat. No. 5,495,754 used mainly for testing aerodynamics of cars. In industry of wind simulators including vertical, horizontal, open and recircular wind tunnels there is a need for compact and in the same time effective wind tunnels. Another niche product is wind force simulators that requires different principles of design as it is necessary to build not only compact and effective wind tunnel, but also a safe wind tunnel. Additionally, a wind flow should be created that resembles wind flow as it is in real life and it does not mean just a downgrade from already known wind tunnel models. Downgrade of already know wind tunnel models will just degrease it effectiveness which at the end would not reach the previously stated aim to design a compact and effective wind force simulator.

The aforementioned aim is reached by the design of a horizontal wind tunnel wind force simulator comprising a recirculating airflow channel. The channel has generally rectangular configuration—rectangular cross section. The recirculating airflow channel comprises a first horizontal side member, a first airflow turning member, a return side member and a second airflow turning member. The return side members may in made as bent air flow turning members or channels, or a straight air flow turning members or channels having built in turning vanes for further increasing effectiveness of turning an air flow.

The simulator further comprises a horizontal simulator chamber capable of accommodating at least one human during normal use. The horizontal simulator chamber is housed within the first horizontal side member of the airflow channel. Moreover, the first horizontal side member comprises a contraction member. The contraction member is fitted in the proximity or at the inlet side of the first horizontal side member. The contraction member is a part of the horizontal simulator chamber. The compression ratio of the contraction member is in the range of 2.5:1 (inlet cross section:outlet cross section) to 1.25:1 that is very unusual or very low compression ratio for wind tunnels compared to the wind tunnels as disclosed in US patent application publication No. US2005/241385 and US patent publication No. U.S. Pat. No. 5,495,754. Prior art wind tunnels have the compression ratio starting from 4:1 and above. The first horizontal side member also comprises a diffusor. The diffusor is mounted on the outlet side of the first horizontal side member. The diffusor is a part of the horizontal simulator chamber.

Both the contraction member and the diffusor form a part of the simulator chamber, or the simulation chamber comprises the part of contraction member and the part of the diffusor. In another embodiment of the invention, the simulator chamber may comprise entirely all contraction member and/or diffusor.

A fan is mounted in the return side member and configured to generate an air flow. The simulator may comprise one fan or multiple fans. In one embodiment of the invention a plurality of fans may be arranged in side-by-side arrangement. In another embodiment of the invention, the return side member comprises separate side channels in a side-by-side arrangement, wherein in each side channel comprises the fan. Moreover, each fan is arranged so that it is not in a side-by-side arrangement to the adjacent fan of the adjacent side channel. This arrangement allows to design even more compact horizontal wind tunnel without compromising its effectiveness or power requirement.

The horizontal simulator chamber comprises at least one access point. In a preferable embodiment of the invention the horizontal simulator chamber comprises at least two access points. One access point is fitted in the outlet side of the horizontal simulator chamber and another access point is fitted in the inlet side of the horizontal simulator chamber so that at least one human can enter in the horizontal simulator chamber through a one access point and exit through another access point and vice versa. This design of at least two access points greatly increases a safety of use as allows the user of the horizontal simulator chamber entry and exit the simulator at the most preferable areas of the horizontal simulator chamber, which are areas of the contraction member and diffusor, where in certain sections a decrease in the wind speed is present. Moreover, each access point may comprise a door.

Another aspect of the invention is that the length of the horizontal simulator chamber is bigger than the length of any of the turning members or height of any of the turning members when the return side member is positioned above the first horizontal side member. The length of the horizontal simulator chamber is 0.7 to 1.0, preferably 0.8 to 1.0, from the length of the first horizontal side member. The first horizontal side member is section of the wind tunnel between the first airflow turning member and the return side member. This 0.7 to 1.0, preferably 0.8 to 1.0, ratio is very unusual ratio because prior art wind tunnels keep at least the contraction member out from the simulator chamber. As the contraction member forms considerable part of the horizontal side member, then the length of the horizontal simulator chamber in the prior art horizontal wind tunnels is in the range of 0.3 to 0.5 from the length of the first horizontal side member. This implementation of the diffusor and the contraction member in the horizontal simulator chamber allows it to make safer for human use as it allows safe entrance in the horizontal simulator chamber—the user enters/exits the horizontal simulator chamber in the area of the diffusor and the contraction member where the wind speed is the lowest compared to the wind seed within the horizontal simulator chamber where are not the diffusor and the contraction member.

In another embodiment of the invention, the horizontal wind tunnel further comprises a barrier arranged within the horizontal simulator chamber so that the horizontal simulator chamber is virtually divided in two longitudinal chambers. Additionally, the wind tunnel at the outflow end of the horizontal simulator chamber comprises a net for the safety of the users of the simulator.

The horizontal wind tunnel may be at least in two general configurations. In one configuration the return side member is positioned above the first horizontal side member. In another configuration the return side member is positioned on one side of the first horizontal side member. In another configuration the return side member is positioned on one side and above the first horizontal side member.

The present invention also includes a method for operation of the horizontal wind tunnel. The method comprises the following steps:

setting up a maximum wind speed to be reached in a simulator chamber;

entry of the human or the user in the simulator chamber;

starting up fans of the wind tunnel by gradually increasing a wind speed to the pre-set maximum wind speed within 3 to 10 seconds, preferably 5 seconds;

maintaining said pre-set maximum wind speed within the simulator chamber for 15 to 60 seconds, preferably for 15 to 35 seconds;

gradually decreasing the wind speed from the pre-set maximum wind speed;

exit of the human or the user from the simulator chamber (6). The following method allows the human or the user to entry into the simulator chamber, gain experience of wind speed as it is felt for example during the storm, and exit from the simulator chamber in a safely manner.

The time for gradual increase, maintenance and gradual decrease of the wind speed is set by the operator of the wind tunnel. The method also comprises an option that the gradual decrease of the wind speed is initiated by the user of the wind tunnel within the simulator chamber by pushing a button situated within said simulator chamber.

The drawings illustrate generally, by way of example, but not by way of limitation, various embodiments of the invention.

Figure 1:
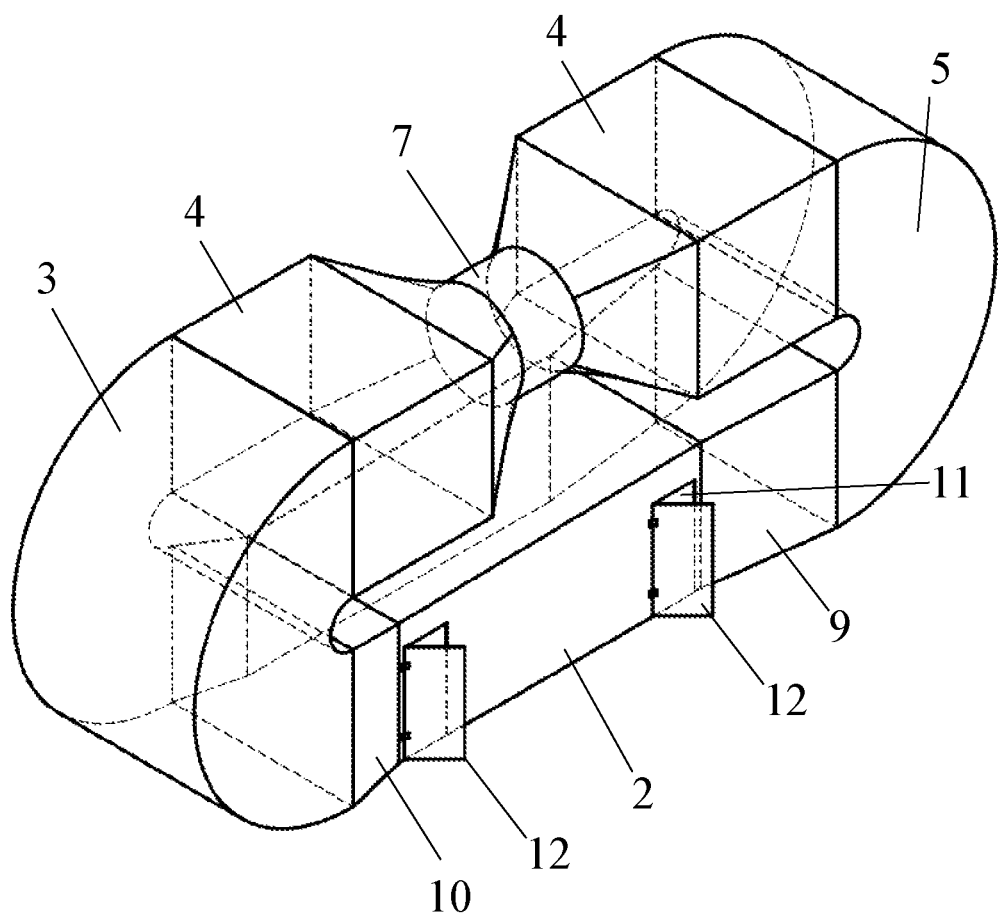
FIG. 1 is a perspective view of a horizontal wind tunnel.
Figure 2:
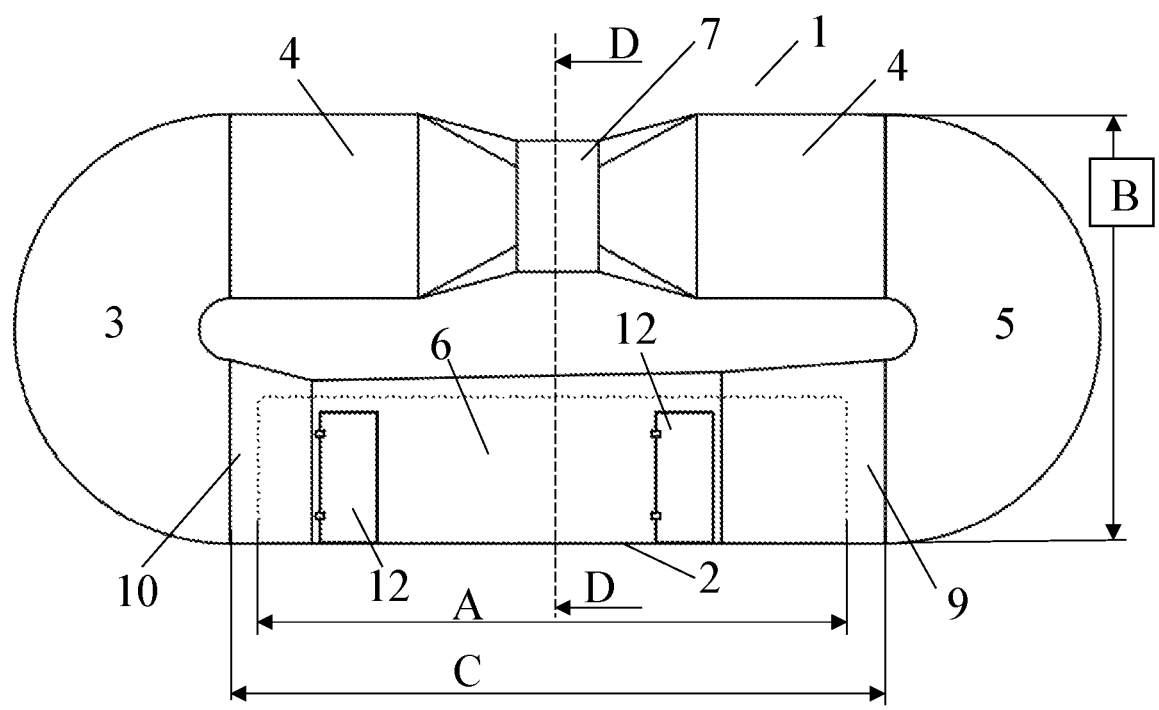
FIG. 2 is a side view of the horizontal wind tunnel as seen in FIG. 1 with defined horizontal simulator chamber (6) enclosed by illustrative doted rectangular.
Figure 3:
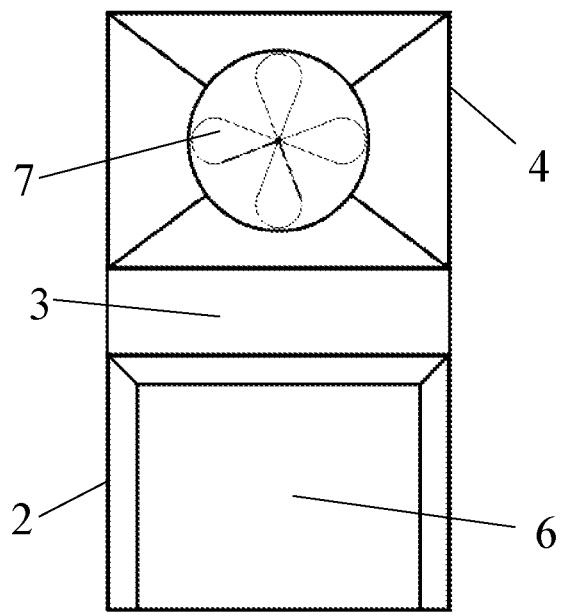
FIG. 3 is a cross-sectional view (D-D) of the horizontal wind tunnel as seen in FIG. 2.
Figure 4:
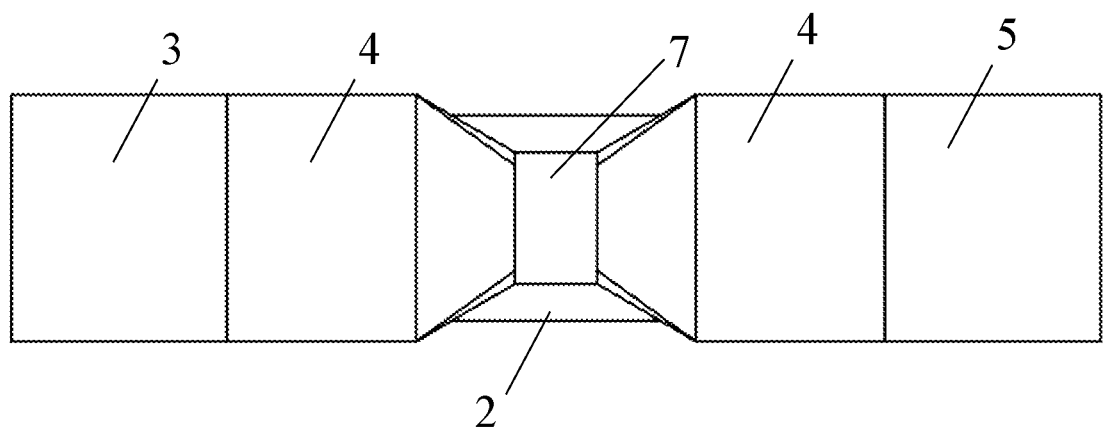
FIG. 4 is a top view of the horizontal wind tunnel as seen in FIGS. 1 to 3.
Figure 5:
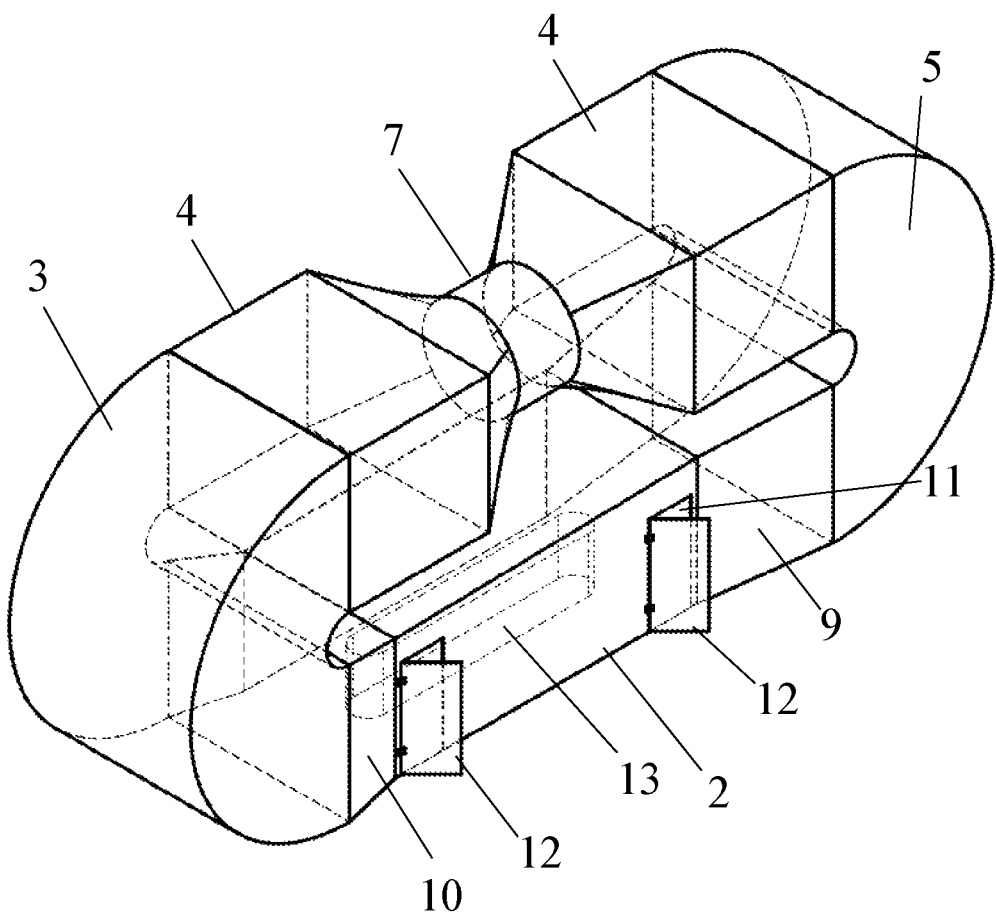
FIG. 5 is a perspective view of the horizontal wind tunnel as seen in FIG. 1 that further comprises a barrier (13) disposed in the first horizontal side member (2).

A horizontal wind tunnel wind force simulator (FIGS. 1 to 5) comprises a recirculating airflow channel (1) having a generally rectangular configuration, wherein the recirculating airflow channel (1) comprises a first horizontal side member (2), a first airflow turning member (3), a return side member (4) and a second airflow turning member (5). The first horizontal side member (2) accommodates a horizontal simulator chamber (6) capable of accommodating at least one human during normal use. The tunnel further comprises a fan (7) mounted in middle of the return side member (4). The wind tunnel further comprises a contraction member (9) fitted in the inlet side of the first horizontal side member (2). The contraction member (9) is part of the horizontal simulator chamber (6). The compression ratio of the contraction member (9) is 3:1. The wind tunnel further comprises a diffusor (10) mounted on the outlet side of the first horizontal side member (2). The diffusor (10) is also the part of the horizontal simulator chamber (6).

The horizontal wind tunnel further comprises two access points (11) with the doors (12). The access points (11) are built in the first horizontal side member (2) for access of the horizontal simulator chamber (6). Basically, the access points (11) are built in the horizontal simulator chamber (6) to provide access thereof. One access point (11) is fitted in proximity to the outlet side of the first horizontal side member (2) and another access point (11) is fitted in proximity to the inlet side of the first horizontal side member (2) so that at least one human can enter in the horizontal simulator chamber (6) enclosed by the first horizontal side member (2) through a one access point (11) and exit through another access point (11). During normal use a user will enter the horizontal simulator chamber (6) through the access point (11) at the outlet side of the horizontal simulator chamber (6) enclosed by the first horizontal side member (2). Then the user will be able to proceed further within the horizontal simulator chamber (6) to the inlet side of the horizontal simulator chamber (6) experiencing an air flow generated within the chamber (6). Upon reaching the inlet side of the horizontal simulator chamber (6), the user may exit the chamber (6) via the access point (11) fitted in the inlet side of the first horizontal side member (2).

In the following embodiment of the invention (FIGS. 1 to 5) the return side member (4) is positioned above the first horizontal side member (2). The following configuration enable the wind tunnel to be compact and easy to install within restricted areas or volume.

The horizontal wind tunnel is characterized in that the length (A) of the horizontal simulator chamber (6) is longer than the length (B) of any of the turning members (3; 5). In the following configuration when the return side member (4) is above the first horizontal side member (2) the (B) is height of any of the turning members (3; 5). Moreover, the length (A) of the horizontal simulator chamber (6) 1.0 from the length (C) of first horizontal side member (2).

Additionally, the horizontal simulator chamber (6) comprises a barrier (13) so that the horizontal simulator chamber (6) is virtually divided in two longitudinal chambers.

Figure 6:
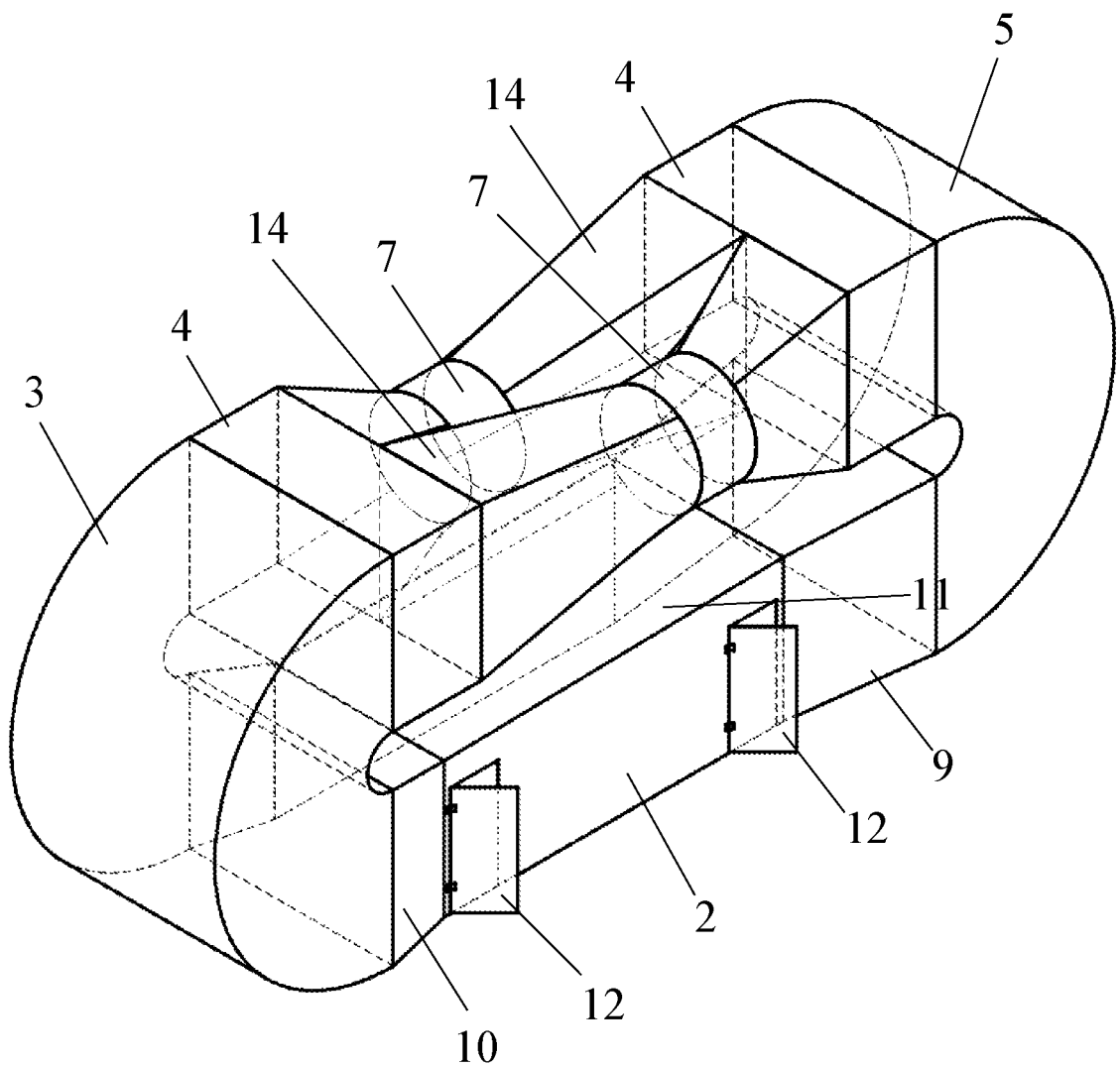
FIG. 6 is a perspective view of another embodiment of the horizontal wind tunnel.

FIG. 6 is a perspective view of another embodiment of the horizontal wind tunnel. The horizontal wind tunnel differs from previously disclosed embodiments that the return side member (4) comprises at least two side channels (14). Each side channel (14) comprises the fan (7). The fans (7) are not arranged in a side-by-side arrangement. One fan (7) in the one side channel (14) is arranged more upstream than another fan (7) in another side channel (14). This arrangement allows to create more compact return side member (4) without compromising its operational performance. In embodiment of more than two side channels (14), for example six side channels (14), all six fans (7) will be arranged in upstream or downstream arrangement to each other, so the fans are not in the side-by-side arrangement.

While the invention may be susceptible to various modifications and alternative forms, specific embodiments of which have been shown by way of example in the figures and have been described in detail herein, it should be understood that the invention is not intended to be limited to the particular forms disclosed. Rather, the invention includes all modifications, equivalents, and alternatives falling within the scope of the invention as defined by the following claims.

The invention claimed is:

1. A horizontal wind tunnel wind force simulator comprising:
   a recirculating airflow channel (1), wherein the recirculating airflow channel (1) comprises a first horizontal side member (2), a first airflow turning member (3), a return side member (4), and a second airflow turning member (5);
   a horizontal simulator chamber (6) capable of accommodating at least one human during normal use and housed within the first horizontal side member (2) of the airflow channel (1);
   a fan (7) mounted in the return side member (4) and configured to generate an air flow;
   a contraction member (9) fitted at the inlet side of the first horizontal side member (2), wherein the compression ratio of the contraction member (9) is in the range of 2.5:1 to 1.25:1, and wherein the part of the contraction member (9) is also the part of the horizontal simulator chamber (6);

a diffusor (10) mounted at the outlet side of the first horizontal side member (2), wherein the part of the diffusor (10) is also the part of the horizontal simulator chamber (6);

at least one access point (11) built in the horizontal simulator chamber (6);

wherein the length (A) of the horizontal simulator chamber (6) is longer than the length (B) of any of the turning members (3; 5); and wherein the length (A) of the horizontal simulator chamber (6) is 0.7 to 1.0 from the length (C) of the first horizontal side member (2).

2. The horizontal wind tunnel according to claim 1, characterized in that at least two access points (11) built in the horizontal simulator chamber (6), wherein one access point (11) is fitted at the outlet side of the horizontal simulator chamber (6) and another access point (11) is fitted at the inlet side of the horizontal simulator chamber (6) so that at least one human can enter in the horizontal simulator chamber (6) through the one access point (11) and exit through another access point (11) and vice versa.

3. The horizontal wind tunnel according to claim 1, characterized in that it further comprises a barrier (13) arranged within the horizontal simulator chamber (6) so that the horizontal simulator chamber (6) is virtually divided in two longitudinal chambers.

4. The horizontal wind tunnel according to claim 1, characterized in that the return side member (4) comprises a plurality of fans (7) in a side-by-side arrangement.

5. The horizontal wind tunnel according to claim 1, characterized in that the return side member (4) comprises separate side channels (14) in a side-by-side arrangement, wherein in each side channel (14) comprises the fan (7) and wherein each fan (7) is arranged so that it is not in a side-by-side arrangement to the adjacent fan (7) of the adjacent side channel (14).

6. The horizontal wind tunnel according to claim 1, characterized in that the return side member (4) is positioned above the first horizontal side member (2).

7. The horizontal wind tunnel according to claim 1, characterized in that the access point (11) comprises a door (12).

8. The horizontal wind tunnel according to claim 1, characterized in that the length (A) of the horizontal simulator chamber (6) is 0.8 to 1.0 from the length (C) of the first horizontal side member (2).

9. A method for operation of the horizontal wind tunnel comprising the following steps:
a) setting up a maximum wind speed to be reached in a simulator chamber (6);
b) entry of a human in the horizontal simulator chamber (6);
c) gradually increasing a wind speed to the pre-set maximum wind speed;
d) maintaining said pre-set maximum wind speed within the horizontal simulator chamber (6) for 15 to 60 seconds;
e) gradually decreasing the wind speed from the pre-set maximum wind speed; and
f) exit of the human from the simulator chamber (6).

10. The method according to claim 9, wherein the method includes the step of repeating the steps b) to f).

11. The method according to claim 9, wherein the gradual decrease of the wind speed is initiated by the user of the wind tunnel within the simulator chamber (6) by pushing a button situated within said simulator chamber (6).

12. The method according to claim 9, wherein in step d) the pre-set maximum wind speed within the horizontal simulator chamber (6) is maintained for 15 to 35 seconds.

* * * * *